United States Patent
Duffy et al.

(10) Patent No.: US 9,020,873 B1
(45) Date of Patent: Apr. 28, 2015

(54) DECISION ENGINE USING A FINITE STATE MACHINE FOR CONDUCTING RANDOMIZED EXPERIMENTS

(75) Inventors: Michael O. Duffy, Hebron, CT (US); William Everett, Wethersfield, CT (US); Steve Roach, West Hartford, CT (US)

(73) Assignee: The Travelers Indemnity Company, Hartford, CT (US)

( * ) Notice: Subject to any disclaimer, the term of this patent is extended or adjusted under 35 U.S.C. 154(b) by 240 days.

(21) Appl. No.: 13/480,435

(22) Filed: May 24, 2012

(51) Int. Cl.
G06E 3/00 (2006.01)
G06N 5/04 (2006.01)
G06N 99/00 (2010.01)
G06Q 40/08 (2012.01)

(52) U.S. Cl.
CPC .................. G06N 5/04 (2013.01); G06Q 40/08 (2013.01); G06N 99/005 (2013.01)

(58) Field of Classification Search
CPC ........ G06N 5/04; G06N 99/005; G06Q 40/08
USPC ............................. 706/46, 45; 705/4; 719/318
See application file for complete search history.

(56) References Cited

U.S. PATENT DOCUMENTS

| | | | |
|---|---|---|---|
| 5,186,460 A * | 2/1993 | Fongeallaz et al. | 463/6 |
| 5,930,792 A | 7/1999 | Polcyn | |
| 6,496,831 B1 * | 12/2002 | Baulier et al. | 1/1 |
| 6,598,225 B1 | 7/2003 | Curtis et al. | |
| 6,961,954 B1 | 11/2005 | Maybury | |
| 7,509,654 B2 | 3/2009 | Jennings | |
| 7,603,347 B2 | 10/2009 | Thusoo | |
| 7,665,016 B2 | 2/2010 | Behrens | |
| 7,698,735 B2 | 4/2010 | Dujari | |
| 7,802,176 B2 | 9/2010 | Parikh | |
| 7,979,849 B2 | 7/2011 | Feldstein et al. | |
| 2003/0191985 A1 * | 10/2003 | Barrett | 714/32 |
| 2005/0134935 A1 * | 6/2005 | Schmidtler et al. | 358/448 |
| 2007/0003347 A1 | 1/2007 | Manfredi | |
| 2007/0028246 A1 | 2/2007 | Manfredi | |
| 2007/0240103 A1 | 10/2007 | Beaton | |
| 2009/0113241 A1 | 4/2009 | van Ingen | |
| 2011/0054841 A1 * | 3/2011 | Wang | 702/182 |
| 2011/0219350 A1 | 9/2011 | Raghavan | |

OTHER PUBLICATIONS

Etzion et al., Spatial Perspectives in Event Processing, LNCS 6462 pp. 85-107, 2010.*

(Continued)

*Primary Examiner* — Jeffrey A Gaffin
*Assistant Examiner* — Robert H Bejcek, II
(74) *Attorney, Agent, or Firm* — Michael D. Downs; Fincham Downs LLC

(57) ABSTRACT

Systems, apparatus, methods and articles of manufacture provide for implementing a decision engine using a finite state machine for conducting randomized experiments. According to some embodiments, methods may include initializing a decision engine comprising at least one state machine, receiving information defining for the at least one state machine, states and transitions between the states, receiving information defining at least one set of weighted choices, receiving an indication of an occurrence of an event, executing the decision engine to select randomly using the at least one state machine a weighted choice based on the event, and transmitting to the application an indication of the identified random choice.

21 Claims, 8 Drawing Sheets

(56) References Cited

OTHER PUBLICATIONS

Laufer, Interactive Web Applications Based on Finite State Machines, Loyola University Chicago, 1995.*

McGovern et al., Enterprise Service Oriented Architectures, Chapter 8: Event-Driven Architecture, Springer Pub., 2006.*

Mohri et al., The Design Principles of a Weighted Finite-State Transducter Library, Theoretical Computer Science 231, pp. 17-32, 2000.*

Zhongsheng et al., "Towards Modeling Web Navigation Using FSM and Z", Workshop on Intelligent Information Technology Application, Dec. 2-3, 2007, pp. 371-376.

Hallé et al., "Eliminating navigation errors in web applications via model checking and runtime enforcement of navigation state machines", Proceedings of the IEEE/ACM international conference of Automated software engineering, 2010, pp. 235-244.

Li et al., "UML state machine diagram driven runtime verification of java programs for message interaction consistency", Proceedings of the ACM Symposium on Applied Computing, 2008.

Shahriar et al., "PhishTester: Automatic Testing of Phishing Attacks", Secure Software Integration and Reliability Improvement (SSIRI), Jun. 9-11, 2010, pp. 198-207.

John Case, "Stateful Web Application Development with Spring Web Flow", Centare Group, Ltd., downloaded May 18, 2012 from http://www.teamsoftinc.com/madjug/docs/WebFlowPresentation.ppt, 49 pages.

* cited by examiner

US 9,020,873 B1

DECISION ENGINE USING A FINITE STATE MACHINE FOR CONDUCTING RANDOMIZED EXPERIMENTS

BACKGROUND

A finite state machine is a representation of an event-driven system. Event processing arrangements may employ finite state machines to keep track of detected events and their effect. In a finite state machine, a system makes a transition from one state to another provided that the condition defining the transition is true. The finite state machine consists of a number of uniquely named states that are connected by directed, named inbound and outbound transitions. Every state machine has a well-defined entry point, and may have one or more termination states that have no outbound transitions.

A finite state machine may be described using a state transition table. A state transition table describes the relationships among the inputs, outputs, and states of a finite state machine. Hence, the state transition table describes the behavior of a system given specific inputs. Alternatively, the behavior of a system may be described in terms of transitions among states. A state's activity is determined based on the occurrence of certain predefined events under certain conditions. Additionally, a finite state machine may be graphically represented by a state diagram that illustrates transitions of one state to another.

Various types of event-processing frameworks may define for a finite state machine which events must be detected, and rules for processing them, in software executables or libraries. For example, the Java™ Finite State Machine Framework provides extensible actions for finite state machine transitions, which are fixed in code. Accordingly, changes to the event-processing rules or to the sets of events to be detected require software developers to make the changes by modifying the event-processing code and delivering a new version of the entire event-processing system. The time, effort, and expertise that are involved in making these changes can be significant and prohibitive. Workflow event-processing systems may use data files to describe event flows, but lack an ability to associate computations with event transitions. Also known are implementations of finite state machines where the set of states and state transitions are described in XML (extensible markup language) or data files of other formats. But these implementations have no computational ability on state transitions, and so cannot be employed to express event-processing rules. While some known implementations of finite state machines may allow actions to be associated with respective finite state machine states, they provide only a fixed set of actions that are defined as a part of the code defining the finite state machines.

A state machine may be used to control an application. In one example, a state machine may be used to control navigation within a web application. The HTML code (or other type(s) of code) that makes up each web page on the World Wide Web is commonly dynamically generated by an event-driven program (e.g., the web application) that is running on server hardware. The term "web server" may be used to refer to the logical entity that provides a web page in response to an HTTP request and "web application" may be used to refer to the set of components that provide this function using general-purpose computing platforms within general-purpose operating environments such as are provided by Microsoft Corporation's Windows® operating system or by the Linux® operating system and their related programming libraries and tools.

Web applications are generally event-driven interactive systems which react to HTTP requests from a client, the HTTP request being directed to a web address (a URL). The web application may generate and return a web page to the browser. Each action a user takes (e.g., clicking on a particular link on a web page) may have one or more attributes associated with it, such as information about the user, historical information about the user's interaction with the web application, the user's location, current time, and the like. As a result, the resulting web page served by the web application may differ according to the user and/or other factors known or derived by the system.

When an application (e.g., a web application) receives an input, it evaluates the received input and decides how to respond to the client. This evaluation process may involve interaction with business logic, coded, for example, using conditional IF-THEN-ELSE statements that initiate predefined events in response to particular predefined inputs. With respect to web applications, actions performed by a web application typically are driven strictly by user events (e.g., user interactions with the web page, such as clicking on a particular link or button) in accordance with a desired navigation flow. However, the coding of even the simple interactions of forward/backward navigation becomes increasingly difficult as the business rules governing when it is appropriate or not to navigate a user to a given page become too complex.

Previous practices have failed to provide for a decision engine that may be used by various types of applications (e.g., web applications) and that allows next actions to be determined by randomized outcomes (e.g., based on non-uniformly weighted dies), outcomes driven by data from sources other than user inputs, and/or multivariate testing results including parameterized models with cross-coupling effects.

BRIEF DESCRIPTION OF THE DRAWINGS

An understanding of embodiments described in this disclosure and many of the attendant advantages may be readily obtained by reference to the following detailed description when considered with the accompanying drawings, wherein.

DETAILED DESCRIPTION

Figure 1A:
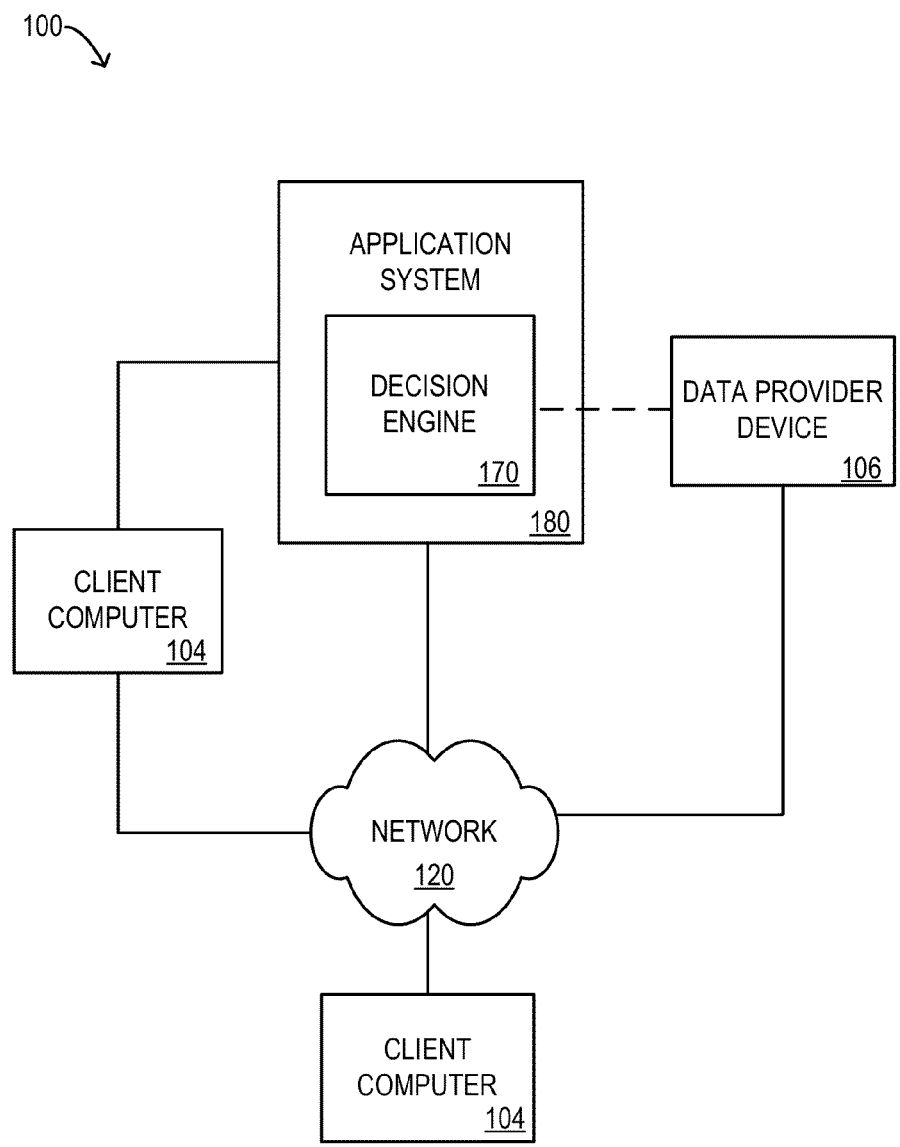
FIG. 1A is a diagram of an application system including a decision engine, according to some embodiments of the present invention.

FIG. 1A depicts a block diagram of an example system 100 for providing an application with a decision engine according to some embodiments. Although reference may be made in this disclosure to examples of web applications and/or navigation frameworks, it will be readily understood that disclosed embodiments may be useful with respect to various types of applications.

The system 100 may comprise one or more client computers 104 in communication with an application system 180 via a network 120. A decision engine 170 is integrated into the application system 180, for example, as an embedded module, a portal, or other functionality accessible through and/or by the application system 180. In one embodiment, information stored by the application system 180 may be provided advantageously to the decision engine 170 for event processing. For example, stored information about an application user (e.g., age, state of residence) may be provided to or otherwise accessible by the decision engine 170 without requiring manual input (e.g., from a user).

In some embodiments, the application system 180 may be hosted by a controller or server computer (e.g., a computer specially programmed to provide for one or more of the functions described in this disclosure). Typically a processor (e.g., one or more microprocessors, one or more microcontrollers, one or more digital signal processors) of a client computer 104 or a server computer will receive instructions (e.g., from a memory device or like device), and execute those instructions, thereby performing one or more processes defined by those instructions. Instructions may be embodied in, for example, one or more computer programs and/or one or more scripts.

In some embodiments the application system 180 and/or one or more of the client computers 104 stores and/or has access to data useful for facilitating desired business workflows. According to some embodiments, any or all of such data may be stored by or provided via one or more optional data provider devices 106 of system 100. A data provider device 106 may comprise, for example, an external hard drive or flash drive connected to a server computer, a remote computer system of a data provider entity for storing and serving data, such as multivariate test scheme data, marketing campaign information, and/or weighted choice information (e.g., for use in conducting one or more randomized experiments), or a combination of such remote and local data devices.

In some embodiments, the application system 180 may store some or all of the program instructions, and a client computer 104, such as a computer workstation or terminal of a user (e.g., a business customer), may execute the application remotely via the network 120, and/or download from the application system 180 (e.g., a web server) some or all of the program code for executing one or more of the various functions described in this disclosure. In some embodiments, a client computer 104 is used to execute an application, stored locally on the client computer 104, that accesses information stored on, or provided via, the application system 180, data provider device 106, one or more other client computers 104, and/or network 120.

In one embodiment, a server computer may not be necessary or desirable. For example, some embodiments described in this disclosure may be practiced on one or more devices without a central authority. In such an embodiment, any functions described in this disclosure as performed by a server computer and/or data described as stored on a server computer may instead be performed by or stored on one or more such devices. Additional ways of distributing information and program instructions among one or more client computers 104 and/or server computers will be readily understood by one skilled in the art upon contemplation of the present disclosure.

Figure 1B:
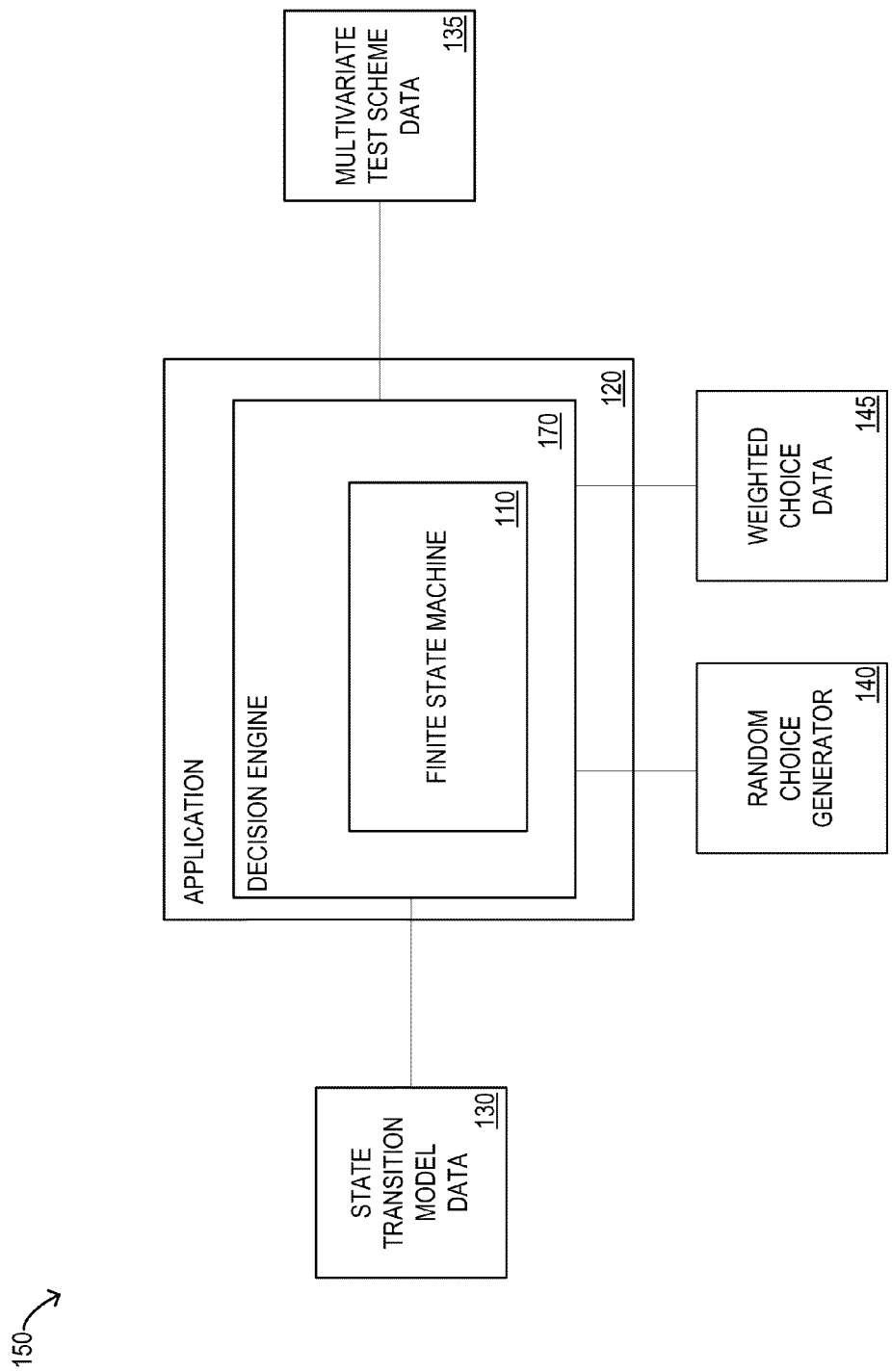
FIG. 1B is a diagram of an application system including a decision engine, according to some embodiments of the present invention.

FIG. 1B depicts a block diagram of an example application system 150, including an application 120 (e.g., a web application) comprising a decision engine 170. The decision engine 170 provides for event processing of events from application 120 based on finite state machine 110. For example, decision engine 170 may receive messages from application 120 and use finite state machine 110 to determine a next state, as discussed below, based on state transition model data 130. State transition model data 130 (e.g., an XML file) describes event processing in such a way that decision engine 170 is neutral with respect to the events and entities with which it interacts. In some embodiments, decision engine 170 emits messages according to the state transition model data 130, and the emitted messages may queue (e.g., via a message bus) for waiting event receivers (e.g., application 120, other applications and services) that have registered for the events.

Decision engine 170 preferably comprises a library of Java™ classes available for use by (e.g., embedded in) one or more applications, such as application 120. In one example, XML may be used, although any desired suitable language may be used. The runtime core, or framework, of decision engine 170 may be defined by the state transition model data 130, which may be an XML design document, and which may be referred to in this disclosure as an XML specification or configuration XML. The configuration of states and transitions may be expressed in any number of formats (e.g., JavaScript™ Object Notation (JSON) text-based data-interchange format, custom XML, Spring Web Flow XML-based flow definition language from SpringSource). State transition model data 130 defines at least one finite state machine 110 in terms of states and transitions. For each type of state transition, state transition model data 130 specifies the computational elements that are associated with that transition. A computational element is an action that is performed upon occurrence of the transition with which the computational element is associated. Thus, the actions that result from a finite state machine transition may be changed by modifying the state transition model data 130 (e.g., revising the XML specification). According to some embodiments, when decision engine 170 starts, it may parse state transition model data 130 (e.g., XML files), constructing Java™ objects according to its elements.

In a web application, for example, expressing navigation as a finite automata/state machine facilitates the expression of navigation rules as data-driven decisions. Accordingly, changes to application flow may be made in one place, without changing the page markup. In one example, the state transition model data 130 for a web application may name its states after web pages. Transition names may be assigned to events emitted by an HTML page (e.g., "previous" or "continue" when those buttons are clicked).

Application system 150 may further comprise multivariate test scheme data 135, which may be used in web applications, for example, to test user responses to web page variations. In one example, multivariate test schemas can be different for each client (e.g., champion/challenger campaign testing and e-mail sending may use independent schemas that are tailored to their respective needs).

Application system 150 may further comprise random choice generator 140 and weighted choice data 145, which may be used in identifying, at random, one choice from among a number of available, predetermined choices for a given state. In one example, a set of weighted choices is stored in a relational database in which each of a plurality of possible actions is assigned a corresponding weight (e.g., an integer value or range). Random choice generator 140 may generate a value (e.g., from 1 to 100), which is mapped to the corresponding option. For instance, a random action state may represent, in a web application, a random, non-uniformly weighted determination of whether to send a user a first purchase offer (a 40% chance) or a second, different purchase offer (a 60% chance). If random choice generator 140 returns a value between 1 and 40, finite state machine 110 will evaluate to the first purchase offer based on weighted choice data 145, and the decision engine 170 will emit an event (e.g., to application 120) for providing to the user the first purchase offer. By changing weighted choice data 145 (e.g., by revising a stored table, or dynamically based on stored rules and historical user data), the behavior of the example web application may be modified without requiring any changes to the web application code.

By utilizing the random choice generator 140 and weighted choice data 145, the decision engine 170 may be used to perform randomized experiments within a given application (e.g., a web application embedding the decision engine 170).

Further, according to some embodiments, action state components (discussed further below) may be added to the finite state machine model. Such action states, rather than being driven solely by input data from an application, may be driven, in accordance with some embodiments, by simulated random rolls of a weighted die (or other random outcome generation process) to choose between any number of alternative actions or transitions.

According to some embodiments, the decision engine 170 may also associate load, submit, and stage events and codes with a state. In one embodiment, a visibility producer component (not shown) may broadcast one or more events to a central, in-memory broker that notifies registered services that the event has occurred. In some embodiments, the visibility producer component is responsible for configuring state objects into a protocol format acceptable by the in-memory broker (e.g., a message bus) and sending the message. The in-memory broker may also handle receipt of the message, maintenance of subscribers, broadcasting of messages, and failover behavior, as necessary. In one embodiment, the visibility producer component provides a standard client that writes events to a database (e.g., for use by a reporting service). By emitting data to a data warehouse, for example, statisticians may analyze data in real time.

In accordance with one or more embodiments described in this disclosure, a state machine may be implemented by defining an interface that describes the methods that every state must implement. The following example defines a Java™ interface called "State":

```
public interface State {
StateType getStateType( );
String getId( );
List<StateEvent> getStateEventList( );
String getView( );
String getInitClass( );
}
```

Figure 2A:
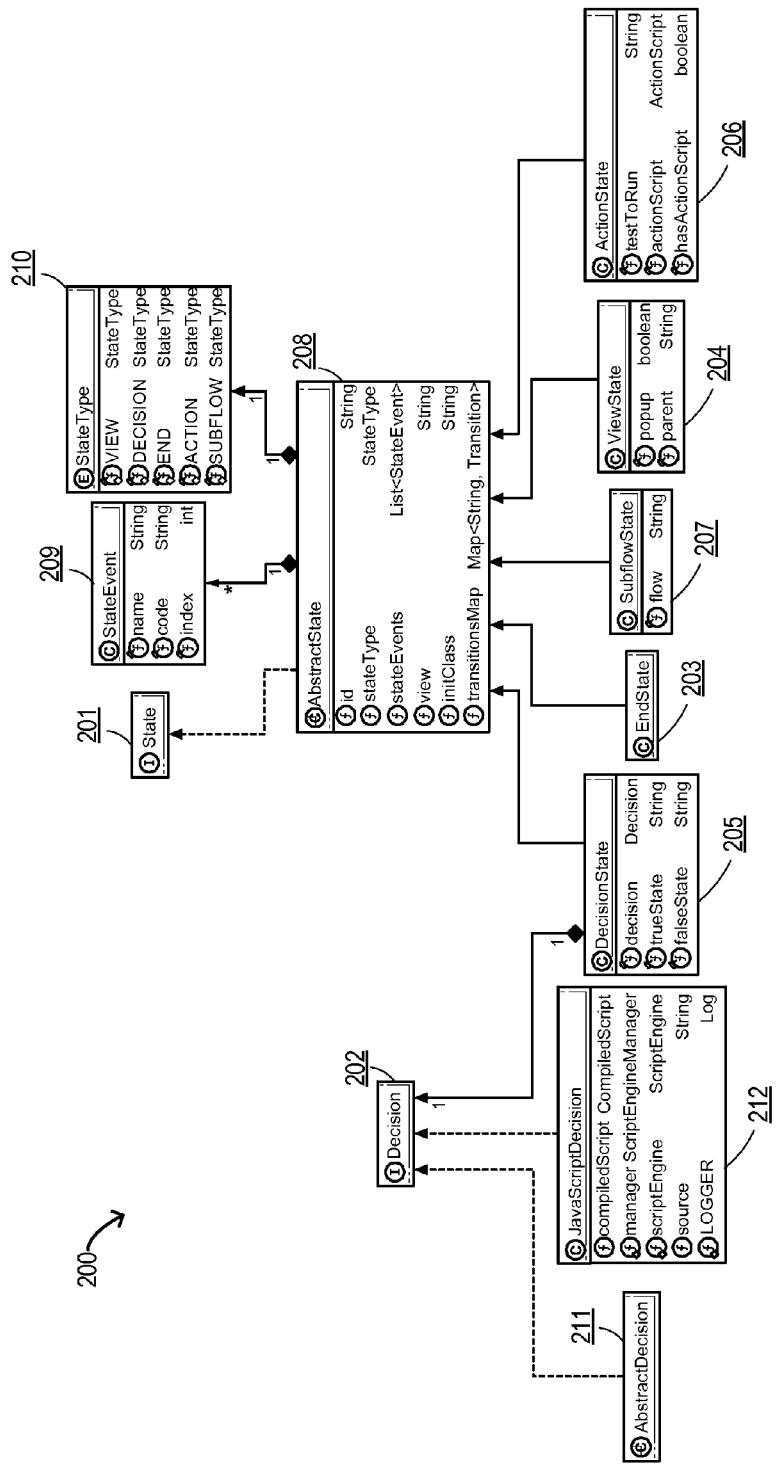
FIG. 2A is a class diagram according to some embodiments of the present invention.

FIG. 2A depicts an example class diagram 200 for a state interface according to one or more embodiments. Class diagram 200 depicts example programming elements that may be used, in accordance with one or more embodiments, for modeling and/or creating finite state machines. The main interface in the example design is represented as State interface 201, which is responsible for deciding what the next state should be based on information about the current state and the name of an event (e.g., received from an application).

In addition to State interface 201, example class diagram 200 comprises example Decision interface 202 and various example associated subclass elements. According to some embodiments, the design of a finite state machine (e.g., finite state machine 110) may utilize one or more different types of defined states. In some embodiments, the types of states may include, without limitation, five different subclasses that implement a state interface (e.g., overriding the method implementations according to their needs): end state, view state, decision state, action state, and sub-flow state. The defined state type subclasses are represented, respectively, in class diagram 200 as EndState 203, ViewState 204, DecisionState 205, ActionState 206, and SubFlowState 207.

According to some embodiments, and as represented, in one example, by AbstractState class 208, every defined state may have an associated ID, an associated type, a list of associated state events that it recognizes by name, and a map of transitions that are keyed by name to state events. The following provides examples in Java™ software, for purposes of illustration only, of how respective subclasses may be defined for handling such information associated with a particular state:

```
public class StateEvent {
private final String name;
private final String code;
private final int index;
public StateEvent(String name, String code) {
   this(name, code, 0);
}
public StateEvent(String name, String code, int index) {
   this.name=name;
   this.code=code;
   this.index=index;
}
public String getName( ) {
   return name;
}
public String getCode( ) {
   return code;
}
public int getIndex( ) {
   return index;
}
public String toString( ) {
   return "StateEvent {"+
      "name='"+name+'\"+
      ", code='"+code+'\"+
      ", index="+index+
      '}';
}
}
```

Other example elements of class diagram 200 include StateEvent class 209, StateType class 210, AbstractDecision class 211, and JavaScriptDecision class 212.

In accordance with some embodiments, a sub-flow state composes any number of other states into a sub-flow having a distinct entry point and a distinct exit point. An end state or termination state has no transitions out to any other states. A view state defines a step that renders a view (e.g., an interface for receiving user input). In one example, a view state is associated with a name that can be used as a key to look up templates for various view templates, emails, etc. A decision state is associated with code (e.g., Java™ or JavaScript™) for computing a binary decision (e.g., based on an IF-THEN-ELSE conditional statement) based on incoming data (e.g., user input forwarded to decision engine 170 as part of the event). A transition element may be used to handle one or more events occurring within a state. In one example, a transition may transition from one view to another, such as from a first webpage to another upon the clicking of a "Next" button on the first webpage. In accordance with some embodiments, an action state may be used to control decision making by identifying the appropriate action choice deterministically, based on incoming data, or at random. An action state may be used, for example, to execute an action (e.g., based on associated code) and then transition from the current state (or stay in the same state) based on the outcome of the action.

As discussed in this disclosure, an implementation of a state machine may have an associated graph defining the states, events, and transitions. In accordance with some embodiments, a graph may be implemented as a Java™ class that encapsulates a collection of states. As discussed in this disclosure, a graph may also provide facilities for parsing and validating the information (e.g., an XML file) that defines one or more state machines. In some embodiments, an interface is provided that defines at least two operations: (1) looking up a particular state by name, and (2) determining the next state in the flow given one or more of (a) the name of the current state, (b) an object representing the application data, and (c) the name of a triggered state event. The following provides one example, for purposes of illustration only, of an implementation of an example StateMachine interface providing for such operations:

```
public interface StateMachine {
    State getNextState(String currentStateId, Object navDecisionVO, String inputEvent) throws ScriptException,
        NoSuchMethodException;
    State getState(String stateName) throws Exception;
}
```

Figure 2B:
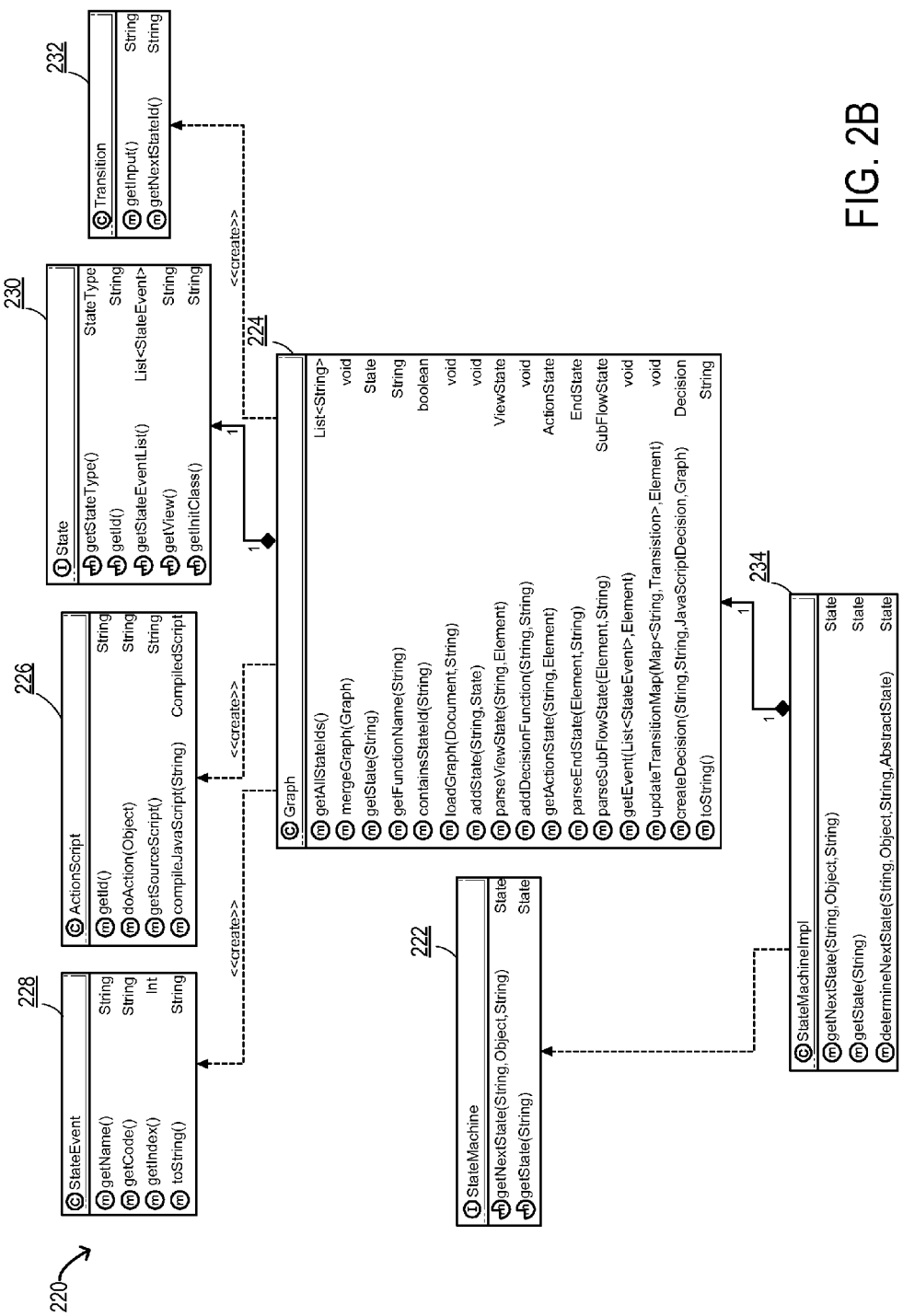
FIG. 2B is a state machine model class diagram according to some embodiments of the present invention.

FIG. 2B depicts an example state machine model class diagram 220 for an example implementation of a state machine according to one or more embodiments. It will be readily understood by one skilled in the art that class diagram 220 represents an example programming implementation utilizing one or more of the program elements depicted in class diagram 200.

The main interface in the example class diagram 220 is represented as StateMachine interface 222, which is responsible for deciding what the next state should be (e.g., for an application flow) based on information about the current state and the name of an event (e.g., received from an application). Example Graph class 224 represents a program element for establishing a graph of or otherwise defining the plurality of states, and respective transitions between those states, to be followed by the state machine. In one example, the graph of states may be created by reading and parsing an associated XML description (e.g., in one or more XML files) describing the states and/or transitions (e.g., in accordance with a Spring Web Flow XML schema).

In some embodiments, an action state may be associated with code (e.g., ActionScript 226) for performing one or more functions, calculations, determinations, or other type of action. In one example, an action state may provide for selecting or otherwise determining (e.g., dynamically) one choice from among any number of possible choices. In one example, an action state allows for the making of a random choice from among a set of at least two choices.

In some embodiments, each potential choice may be associated with a respective weight. According to some embodiments, the associated weights may be represented as integer numbers that collectively add up to 100; various other ways of mapping different types of generated values (e.g., from a random number generator) with corresponding, predefined outcomes or choices will be readily understood by those of skill in the art. Weights may be assigned to each choice as desired by the particular implementation. In one example, an action state representing a fair coin toss with equally-weighted choices "heads" and "tails" would have a weight of 50 assigned to each choice. In another example, a biased coin toss might correspond to assigning 60 to "heads" and 40 to "tails". For a coin toss with heads on both sides, 100 would be assigned to "heads" and 0 assigned to "tails". Each set of weighted choices may also be associated with a name, and information about the set (e.g., including a description of each associated choice, transition or action and corresponding mapped weight value) may be stored in a relational database or other memory store.

Other example elements of class diagram 220 include StateEvent class 228, State interface 230, Transition class 232, and StateMachineImpl class 234.

As discussed above, some action states may provide for selecting choices from among a set of at least two choices (which may be uniformly or non-uniformly weighted for selection). According to some example implementations, classes may be defined for one or more of: (1) a weighted die function for choosing between alternatives with different weights (e.g., that add to 100%); (2) a shooter function, which maintains a collection of weighted dies and allows users to select from among the collection of weighed dies by name and/or roll them to make a randomized choice; and (3) a factory function for instantiating one or more shooters from data stored in a repository (e.g., weighted choice data 145). The following provide examples, for purposes of illustration only, of example WeightedDie, Shooter, and ShooterFactory classes:

```
public class WeightedDie {
    private static final int ONE_HUNDRED_PERCENT=100;
    private Random random;
    private final String[ ] choices;
    private final int[ ] totals;
    public WeightedDie(String[ ] choices) {
        this(choices, generateEqualWeights(choices));
    }
    public WeightedDie(String[ ] choices, Integer[ ] weights) {
        if (choices==null)
            throw new IllegalArgumentException("Choices array
                cannot be null");
        if (weights==null)
            throw new IllegalArgumentException("Weights array
                cannot be null");
        if (choices.length !=weights.length)
            throw new IllegalArgumentException("Choices and
                weights arrays must be the same length");
        this.random=new Random(System.currentTimeMillis( ));
        this.choices=new String[choices.length];
        System.arraycopy(choices, 0, this.choices, 0, choices.length);
        this.totals=initializeTotals(choices, weights);
    }
    public WeightedDie(Map<String, Integer> choicesAndWeights, Random random) {
        this(choicesAndWeights.keySet( ).toArray(new String
            [choicesAndWeights.keySet( ).size( )]),
            choicesAndWeights.values( ).toArray(new Integer
            [choicesAndWeights.values( ).size( )]));
        this.random=random;
    }
    public synchronized String roll( ) {
        String choice=choices[choices.length-1];
        // Choose a random value between 0 and 100 exclusive
        int value=this.random.nextInt(ONE_HUNDRED_PERCENT);
        for (int i=0; i<totals.length; ++i) {
            if (value<totals[i]) {
                choice=choices[i];
                break;
            }
        }
        return choice;
    }
```

```
private static Integer[ ] generateEqualWeights(String[ ]
    choices) {
    if (choices==null)
        throw new IllegalArgumentException("Choices array
            cannot be null");
    int numChoices=choices.length;
    Integer[ ] weights=new Integer[numChoices];
    int weight=ONE_HUNDRED_PERCENT/numChoices;
    int total=0;
    for (int i=0; i<(numChoices-1); ++i) {
        weights[i]=weight;
        total+=weight;
    }
    weights[numChoices-1]=ONE_HUNDRED_PER-
        CENT-total;
    return weights;
}
private int[ ] initializeTotals(String[ ] choices) {
if (choices==null)
    throw new IllegalArgumentException("Choices array
        cannot be null");
    int numChoices=choices.length;
    int[ ] totals=new int[numChoices];
    int total=0;
    for (int i=0; i<numChoices; ++i) {
        total+=ONE_HUNDRED_PERCENT/numChoices;
        totals[i]=total;
    }
    totals[numChoices-1]=ONE_HUNDRED_PERCENT;
    return totals;
}
private int[ ] initializeTotals(String[ ] choices, Integer[ ]
    weights) {
    int numChoices=choices.length;
    int[ ] totals=new int[numChoices];
    int total=0;
    for (int i=0; i<numChoices; ++i) {
        total+=weights[i];
        totals[i]=total;
    }
    if (total !=ONE_HUNDRED_PERCENT)
        throw new IllegalArgumentException(String.format
            ("Weights must sum to exactly % d\n", ONE_HUN-
            DRED_PERCENT));
    return totals;
    }
}
```

Figure 2C:
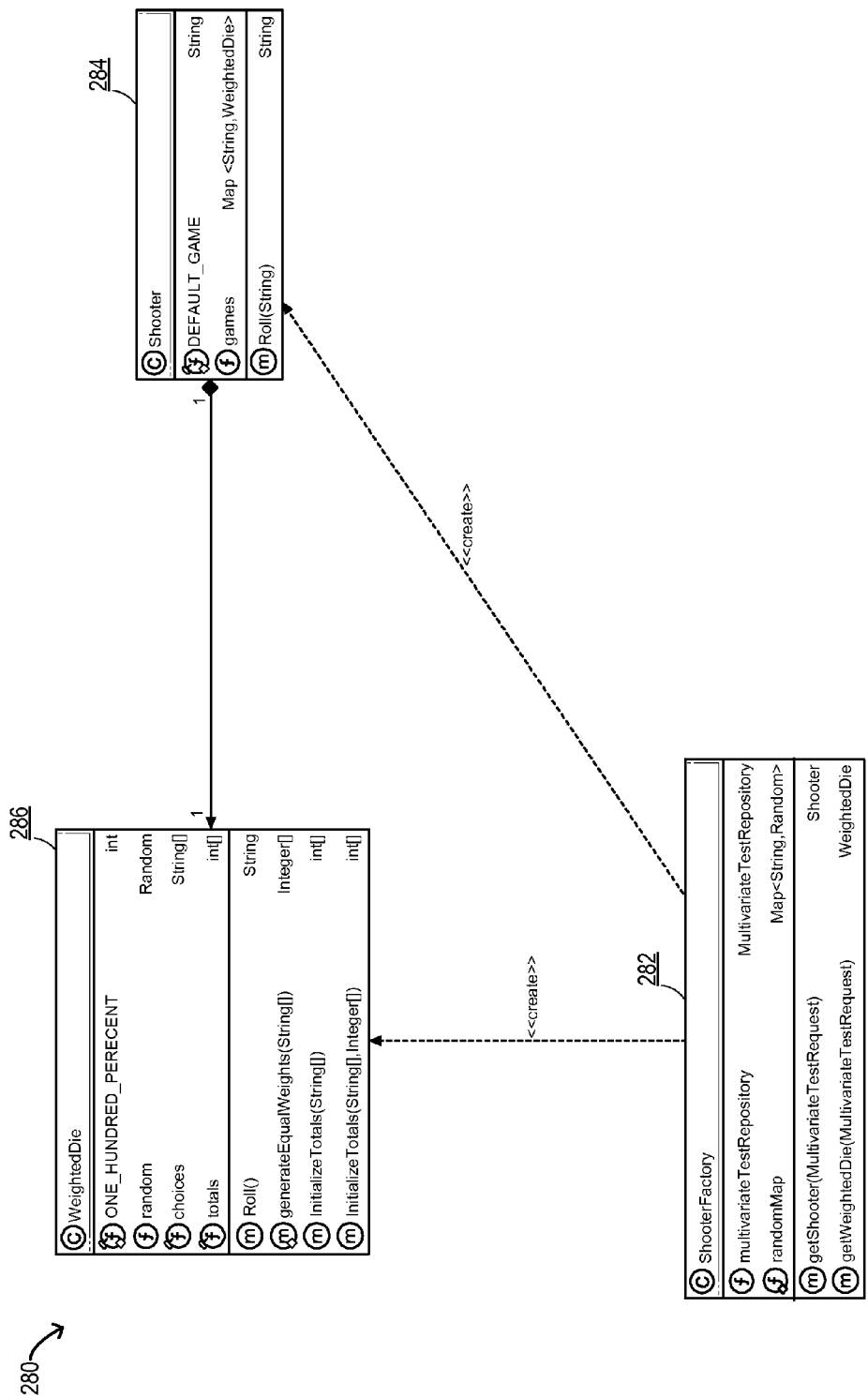
FIG. 2C is a class diagram according to some embodiments of the present invention.

FIG. 2C depicts an example class diagram 280 for an example implementation of program elements for generating random outcomes, in accordance with one or more embodiments. The class diagram 280 includes a representative factory class (ShooterFactory 282) for creating one or more Shooter classes 284 for generating random selections from among two or more options. WeightedDie class 286 represents an example random number generator which may be used, in accordance with some embodiments, to generate random values (e.g., for mapping to predefined available choices).

In some embodiments, specific implementations of the StateMachine class 222 and/or multivariate test scheme data may be left to clients of StateMachine class 222 to implement as they wish. For example, clients may choose to store XML descriptions in a file system, a relational database, or hard-wired in a memory device.

According to various embodiments described in this disclosure, systems, methods, apparatus, and software applications stored, for example, on computer readable storage devices or other media, may utilize a state machine for carrying out the processes and functions of an application. The defined processes of the application or program (e.g., the flows, functions, dialogs, other components, etc.) may be executed in accordance with one or more defined states. In one example, a value of a state variable indicates a corresponding state. A method checks for a current value of the state variable. Any given function or step within any given state (e.g., an action state), or input received from a user, such as through "Next" or "Previous" buttons on a web application interface, can return a value for the state variable. In some embodiments, when a method determines a value of the state variable, an object corresponding to the state indicated by the determined value is enabled.

In one example implementation of the decision engine 170, a navigation framework using a state machine may be installed in a web navigation application, the navigation framework describing every possible state and transition for navigating through the application. The operation of such a web application may include receiving an incoming HTTP request by an application controller that manages application flow and logic. The HTTP messages sent to the application server are translated into event objects that are meaningful for the application. Then, the events are passed to a decision engine that processes the event according to a state machine definition (e.g., state transition model data 130). After event handling and a new application state has been determined, display of the page associated with that new state is triggered.

Accordingly, a navigation framework may be implemented, as described in this disclosure, as an autonomous decision-making engine using a finite state machine. The description of transition between states, and their causes, for a given navigation architecture, may be externalized from the software components (e.g., web application code) that implement them. In some embodiments, a small, self-contained set of Java™ software components may fulfill all requirements of transitioning between states in a web application using fewer classes and lines of code than would otherwise be necessary if the required navigation conditions were coded in the application itself. Advantageously, the decision engine components (whether based on Java™ software or otherwise) are autonomous; they have and require no knowledge of the application in which they are used. As a result, the decision engine may be added to any Java™ application (e.g., web applications and other types of applications) that requires transitions between states driven by data events and/or randomized, non-uniform weighted dies, allowing for the execution of randomized experiments within an application.

According to some embodiments, use of the decision engine allows that outcomes of a given trial may demonstrate statistically supported judgments about the efficacy of a particular treatment. Further, the decision engine framework may allow for the performance of an analysis of variance to come up with parameterized models that can be incorporated back into the application.

In one embodiment, a parameterized model may be represented as a decision or look-up table. Combinations of input values may be used to look up a predicted optimized value associated in the table with the particular combination of values (e.g., in a unique record entry). In one example, input values for a given prior bodily injury level and age of the oldest driver on an automobile insurance policy may be used to look up a predicted optimal coverage packaged for a potential or current insurance customer. In some embodiments, a parameterized model may be developed (e.g., the content of a decision table determined) based on the outcome of randomized experiment(s) (e.g., conducted using a decision engine employing one or more state machines).

In some of the embodiments described in this disclosure, a web application is described as an example of an interactive system that can be driven by a state machine. More specifically, in some of the embodiments described, the web application dynamically generates web pages, and it will be appreciated that any suitable dynamic Web scripting/programming arrangement may equally be used for this purpose.

It will be appreciated that commercialized forms of some embodiments may in practice take the form of a set of specialized computer programs adapted to direct general-purpose computing platforms within general-purpose operating environments such as are provided by Microsoft Corporation's Windows® operating system or by the Linux® operating system and their related programming libraries and tools. These programs may be marketed, for example, in the form of suitably coded computer program products including program code elements that implement the functionality described. It will be appreciated, though, that the techniques described may equally be implemented as special purpose hardware or any combination of software, hardware, and/or firmware. Some of the techniques described have been primarily developed in the context of a web server where responses generated by the interactive system are web pages. However, it will be understood that the same or similar techniques may also be applied to any similar or comparable interactive system.

As discussed in this disclosure, various embodiments of the decision engine may allow for state changes to be executed using a finite state machine and based on (1) user actions (e.g., a user clicking a button or selecting a menu item on a user interface), (2) data (e.g., asynchronous receipt of an insurance score identifying a customer as an excellent insurance risk), (3) random choices (e.g., a roll of a die, based on random number generation, to choose from among two or more alternatives in a designed experiment), and/or (4) deterministic derivation models (e.g., a lookup in a decision table, calculation, or evaluation of a rules set in a Rete rules engine).

In some embodiments, such as those employing user interfaces, an embedded decision engine may handle every user interaction (e.g., button click or menu selection) and control every transition in the user interface. In some embodiments, the same decision engine may be used (e.g., in accordance with an appropriate configuration file) for an application for non-user interface processing, including champion/challenger choices and randomized experiments in market testing. In one example, different insurance quote packages may be available for offering to a user, each package comprising a different combination of coverage, limits, options, and the like, and the decision engine may select from among the available choices based on one or more of the state change handling capabilities discussed in this disclosure.

Figure 3:
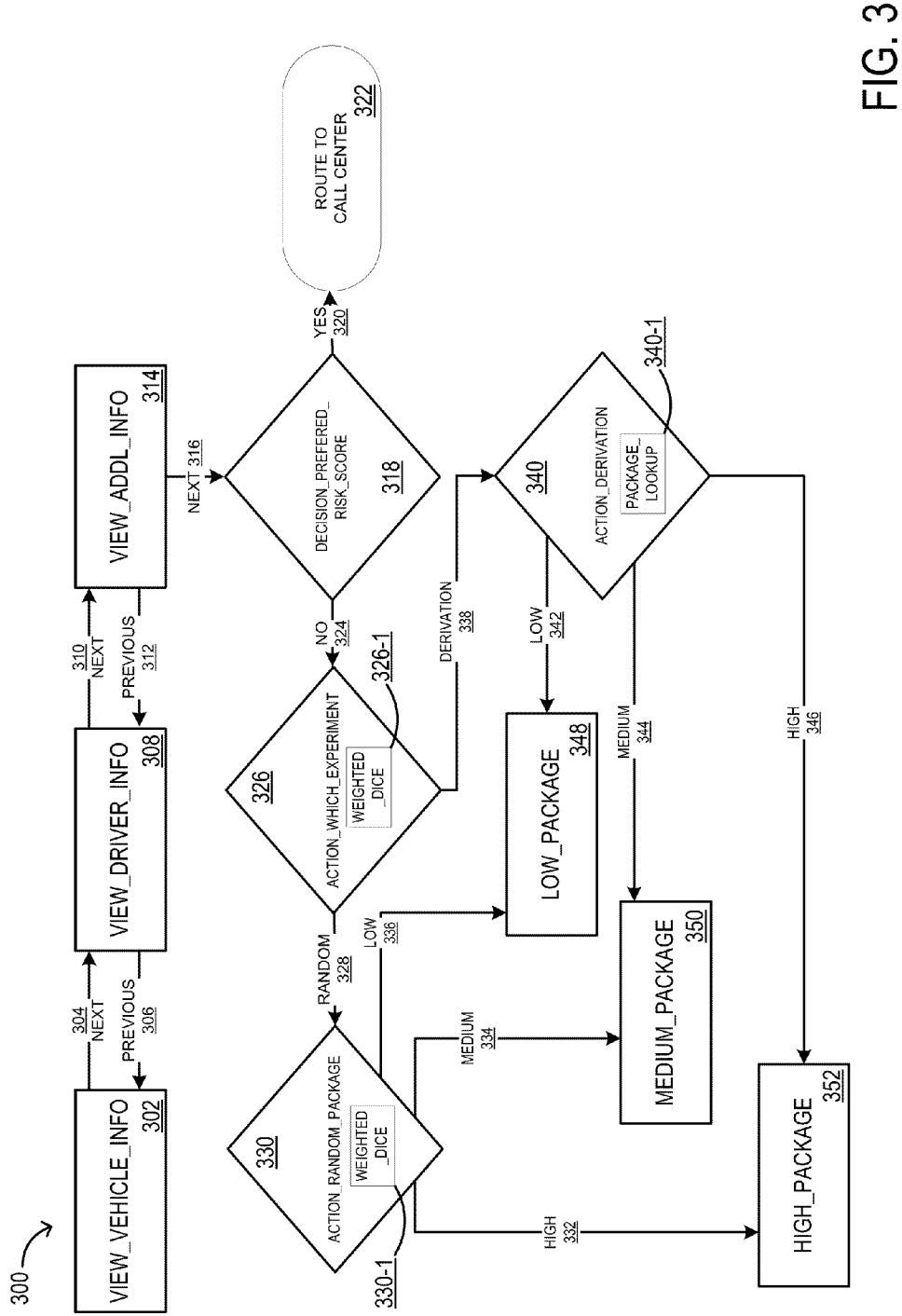
FIG. 3 is a diagram showing example states and transitions of an example web application according to some embodiments of the present invention.

Referring now to FIG. 3, an example state flow diagram 300 shows states and transitions of an example web application according to some embodiments of the present invention. For purposes of illustration, the state flow diagram 300 describes a state flow for a web application for providing a vehicle insurance quote package to a user (e.g., a current or potential customer interacting with the web application via the Internet using a computing device such as a tablet computer, mobile phone, or desktop computer). The state flow diagram 300 is presented for illustrative purposes only. The presently disclosed subject matter is widely applicable to numerous embodiments and implementations, as is readily apparent from the disclosure, and is not limited in scope by the illustrative example in FIG. 3. In general, example state flow diagram 300 demonstrates how state changes, using the disclosed decision engine and finite state machine, may be effected in one or more various ways, and combinations of ways, even within the same application.

VIEW_VEHICLE_INFO state 302 depicts a view state associated with a web page for gathering vehicle summary information from a user. NEXT event 304 is representative of the user selecting a "Next" button on the web page, and VIEW_DRIVER_INFO state 308 represents the view state associated with the next web page for gathering driver information from the user. Similarly, VIEW_ADDL_INFO state 314 is representative of presentation of a third web page, for gathering additional information from the user, that is shown when the user selects a "Next" button on the driver information web page associated with VIEW_DRIVER_INFO 308, initiating NEXT event 310. The events PREVIOUS 306 and PREVIOUS 312 represent the user selecting a "Previous" button on one of the driver information or additional information web pages, respectively, returning the user to the appropriate previous page. Accordingly, FIG. 3 demonstrates an example of how state changes may be driven by user actions, such as a user clicking on a button of a user interface or otherwise providing input to an application. The decision engine, employing a finite state machine, may initiate a determination, based on the user's action, of whether a state should change and/or a determination of a new state.

As illustrated in FIG. 3, if the user selects a "Next" button on the additional information web page, triggering NEXT event 316, the decision engine will execute decision state 318, using data about the user received from a data source (not necessarily the user). In the depicted example, DECISION_PREFERRED_RISK_SCORE 318 represents a decision to route the user (or the user's information) to a call center or to continue with an on-line quote process. Executing the example decision state 318, the decision engine determines an insurance or credit rating score for the user (e.g., by receiving the score from the executing application, or by executing a database look up based on a user's name and/or other information), and evaluates whether (1) the user has a high insurance score or high credit rating (a YES event 320) and the state machine should change the state to represent processing should continue at 322 with a call center, or (2) the user does not have a good enough score (a NO event 324) and the state should flow to ACTION_WHICH_EXPERIMENT action event 326.

Example action event 326 includes a random determination, using WEIGHTED_DICE 326-1, to determine whether the quote process should continue according to (1) a random choice of a quote package for the user or (2) a deterministic or derived model for selecting a quote package for the user. As discussed in this disclosure, a random selection may be uniformly distributed (50%-50%) or non-uniformly distributed (e.g., 20%-80%) between the available options, according to the desired configuration. If the outcome is RANDOM 328, the state is transitioned to ACTION_RANDOM_PACKAGE action event 330, which uses WEIGHTED_DICE 330-1 to determine, at random, one of outcomes HIGH 332, MEDIUM 334, or LOW 336, each corresponding to a change of state to HIGH_PACKAGE state 352, MEDIUM_PACKAGE state 350, or LOW_PACKAGE state 348, respectively.

If ACTION_WHICH_EXPERIMENT 326 results in an outcome of DERIVATION 338, flow transitions to the ACTION_DERIVATION action state 340. Action state 340 includes a process PACKAGE_LOOKUP 340-1 for determining, based on information known and/or derived about the user (e.g., insurance information, claim information, demographic information, psychographic information), a predicted optimal quote package for the user. For instance, based on a determined age range of the user, a state or jurisdiction, and a category of prior bodily injury, etc., action state 340 may identify a record in a database or table that includes the specific information for the user, and includes associated information about a particular predicted quote package that a user with that information profile is likely to accept and/or that would be optimal for the business if the user accepted it. In the example, action state 340 evaluates to one of outcomes LOW 342, MEDIUM 344, or HIGH 346, and FIG. 3 depicts the corresponding state change to one of LOW_PACKAGE state 348, MEDIUM_PACKAGE state 350, or HIGH_PACKAGE state 352, respectively.

Although various embodiments are discussed in this disclosure with respect to web applications and/or centralizing decision making (e.g., navigation) for user interface flows, various embodiments of the decision engine may be useful in contexts other than user interfaces. One non-user interface example, in an insurance context, is to use a random or deterministic decision state to choose between insurance coverage packages in a web service that makes rating requests to a back end controller. Another example non-user interface implementation may use a random or deterministic decision state to choose between e-mail subject line text and body template to satisfy a marketing campaign. In these contexts, a lightweight, in-memory, local, easily configurable decision engine, in accordance with one or more embodiments described in this disclosure, may be used for executing simple business logic that does not require the complexity of a forward or backward induction rules engine (e.g., based on a Rete algorithm).

Figure 4:
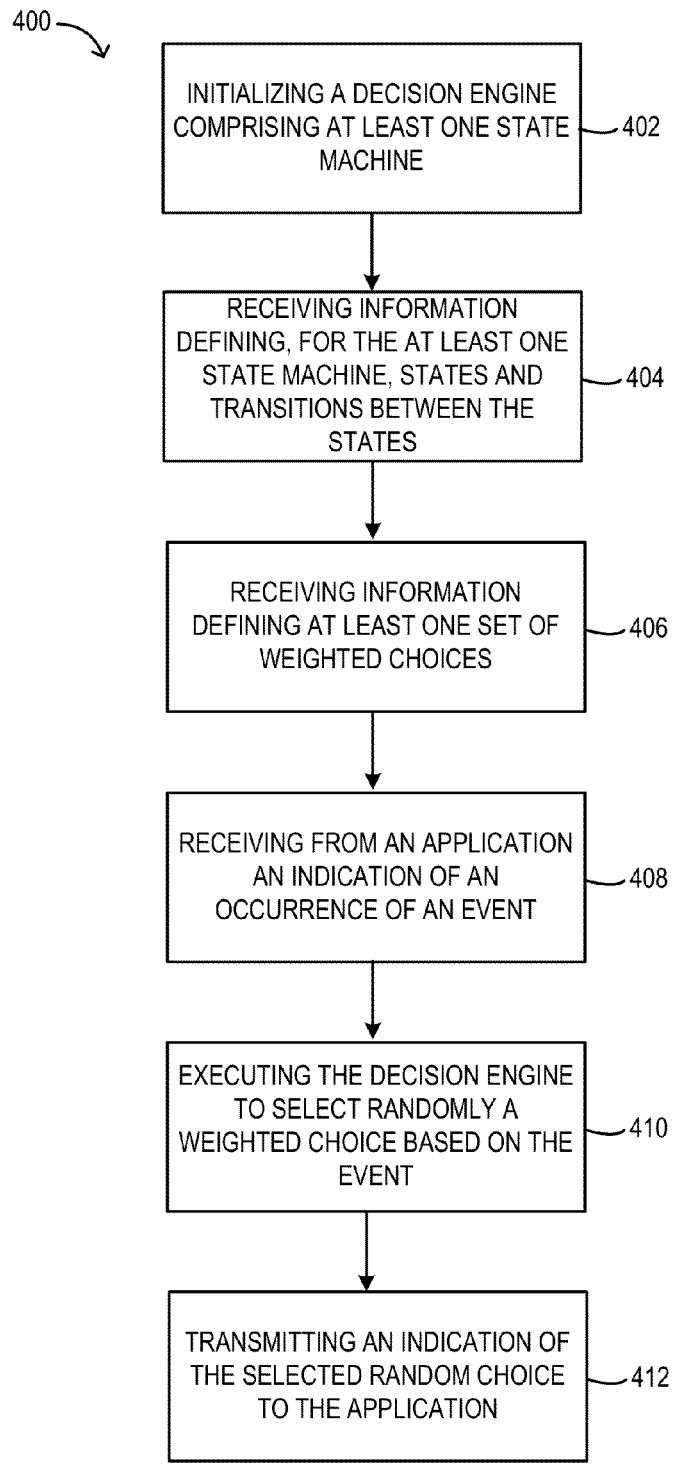
FIG. 4 is a flowchart of a method according to some embodiments of the present invention.

Referring now to FIG. 4, a flow diagram of a method 400 according to some embodiments is shown. The method 400 may, for example, be performed by or on behalf of a business (e.g., an insurance carrier implementing a web application). For purposes of brevity, the method 400 will be described in this disclosure as being performed by a computer (e.g., a specially programmed computer and/or server computer) on behalf of a company. It should be noted that although some of the steps of method 400 may be described in this disclosure as being performed by a server computer while other steps are described in this disclosure as being performed by another computing device, any and all of the steps may be performed by a single computing device which may be a client computer, server computer, data provider device or another computing device. Further, any steps described in this disclosure as being performed by a particular computing device may be performed by a human or another computing device, as appropriate.

According to some embodiments, the method 400 may comprise initializing (e.g., by an application executed by a web server) a decision engine comprising at least one state machine, at 402. The method 400 may further comprise receiving information defining, for the at least one state machine, states and transitions between the states, at 404. As discussed in this disclosure, receiving the information may comprise accessing and/or parsing an XML specification describing all of the states and transitions for implementing the functionality of an application (e.g., a web application).

The method 400 may further comprise receiving information defining at least one set of weighted choices, at 406. As discussed in this disclosure, the information may comprise weighted choice data 145, including information about two or more predefined options, and corresponding weights (e.g., integers, numeric ranges) for mapping to random outcomes (e.g., generated by random choice generator 140, a Shooter 284). Such information may be accessed via and/or received from a relational database (e.g., stored in a memory device).

The method 400 may further comprise receiving from an application an indication of an occurrence of an event, at 408. Various examples of applications transmitting events and other messages to a decision engine and/or finite state machine are discussed in this disclosure, and others will be readily understood by those skilled in the art in light of the present disclosure. In one example, a web application transmits an event representing a user clicking a web page element (e.g., link or button) to a decision engine 170 for processing, to determine the next web page to present to the user.

The method 400 may further comprise executing the decision engine to select randomly a weighted choice based on the event, at 410. As discussed variously in this disclosure, selecting a weighted choice at random may comprise using a random choice generator, shooter or other means to determine a random outcome (e.g., a weighted die roll), and using weighted choice data to select, based on the random outcome, a predefined choice mapped to the determined random outcome. In one example, an action state component generates a weighted die roll and selects from among two or more non-uniformly weighted options for navigating a user to a new web page, presenting a purchase offer, or other state.

The method 400 may further comprise transmitting an indication of the selected random choice to the application, at 412. As discussed in this disclosure, the decision engine may emit a message to the application indicating the new state corresponding to the random choice selected at 410. As also discussed, the decision engine may, alternatively or in addition, emit a message to a service and/or database (e.g., data warehouse) for access by one or more registered clients or other services.

Figure 5:
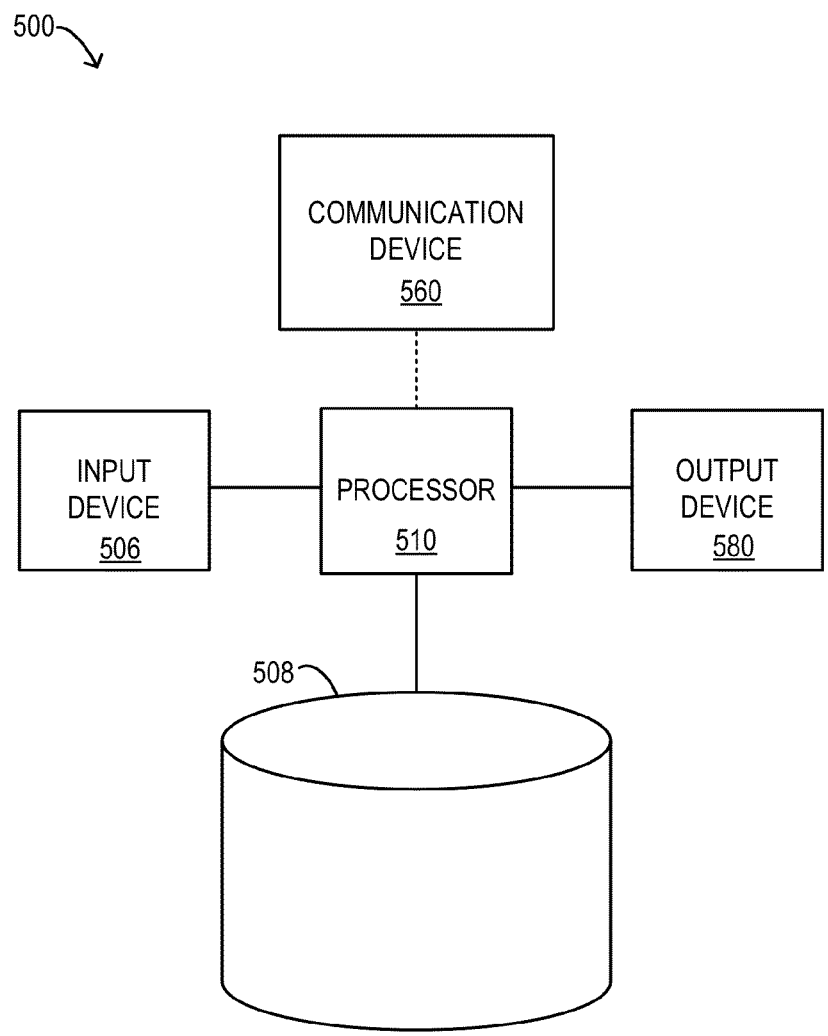
FIG. 5 is a diagram of a computer system according to some embodiments of the present invention.

Turning to FIG. 5, a block diagram of an apparatus 500 according to some embodiments is shown. In some embodiments, the apparatus 500 may be similar in configuration and/or functionality to any of the client computers 104, server computers, data provider devices 106, decision engine 170 and/or application system 180 of FIG. 1A and/or FIG. 1B. The apparatus 500 may, for example, execute, process, facilitate, and/or otherwise be associated with any one or more of the processes described in this disclosure (e.g., method 400 of FIG. 4).

In some embodiments, the apparatus 500 may comprise an input device 506, a memory device 508, a processor 510, a communication device 560, and/or an output device 580. Fewer or more components and/or various configurations of the components 506, 508, 510, 560, 580 may be included in the apparatus 500 without deviating from the scope of embodiments described herein.

According to some embodiments, the processor 510 may be or include any type, quantity, and/or configuration of processor. The processor 510 may comprise, for example, an Intel® IXP 2800 network processor or an Intel® XEON™ processor coupled with an Intel® E7501 chipset. In some embodiments, the processor 510 may comprise multiple inter-connected processors, microprocessors, and/or microengines. According to some embodiments, the processor 510 (and/or the apparatus 500 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 500 comprises a server such as a blade server, necessary power may be supplied via a standard AC outlet, power strip, surge protector, and/or Uninterruptible Power Supply (UPS) device.

In some embodiments, the input device 506 and/or the output device 580 are communicatively coupled to the processor 510 (e.g., via wired and/or wireless connections and/or pathways) and they may generally comprise any types or configurations of input and output components and/or devices that are or become known, respectively.

The input device 506 may comprise, for example, a keyboard that allows an operator (e.g., a programmer or other user) of the apparatus 500 to interface with the apparatus 500 to configure a configuration file, state transition model data, weighted choice data, multivariate test scheme data, decision engine, and/or state machine. In some embodiments, the input device 506 may comprise a sensor configured to provide information, such as an encoded user identifier, to the apparatus 500 and/or the processor 510.

The output device 580 may, according to some embodiments, comprise a display screen and/or other practicable output component and/or device. The output device 580 may, for example, provide historical state information stored during one or more user sessions with a web application to a statistician or other professional to assess the success of different marketing campaigns. According to some embodiments, the input device 506 and/or the output device 580 may comprise and/or be embodied in a single device such as a touch-screen monitor.

In some embodiments, the communication device 560 may comprise any type or configuration of communication device that is practicable. The communication device 560 may, for example, comprise a network interface card (NIC), a telephonic device, a cellular network device, a router, a hub, a modem, and/or a communications port or cable. In some embodiments, the communication device 560 may be coupled to provide data to a telecommunications device. The communication device 560 may, for example, comprise a cellular telephone network transmission device that sends signals (e.g., web application information) to a server in communication with a plurality of handheld, mobile and/or telephone devices. According to some embodiments, the communication device 560 may also or alternatively be coupled to the processor 510. In some embodiments, the communication device 560 may comprise an IR, RF, Bluetooth™, and/or Wi-Fi® network device coupled to facilitate communications between the processor 510 and another device (such as one or more client computers, server computers, central controllers and/or third-party data devices).

The memory device 508 may comprise any appropriate information storage device, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 508 may, according to some embodiments, store one or more of a configuration file, a state transition model data, weighted choice data, multivariate test scheme data, software instructions for an application (e.g., a business application, a web application), software instructions for a decision engine, and/or software instructions for a state machine. In some embodiments, instructions (e.g., finite state machine instructions) may be utilized by the processor 510 to provide output information via the output device 580 and/or the communication device 560.

The apparatus 500 may function as a computer terminal and/or server of an insurance provider, for example, that is utilized to process or manage a web application and/or assess the outcomes of randomized experiments. In some embodiments, the apparatus 500 may comprise a web server and/or other portal (e.g., an interactive voice response unit (IVRU)).

Any or all of the exemplary instructions and data types described herein and other practicable types of data may be stored in any number, type, and/or configuration of memory devices. The memory device 508 may, for example, comprise one or more data tables or files, databases, table spaces, registers, and/or other storage structures. In some embodiments, multiple databases and/or storage structures (and/or multiple memory devices 508) may be utilized to store information associated with the apparatus 500. According to some embodiments, the memory device 508 may be incorporated into and/or otherwise coupled to the apparatus 500 (e.g., as shown) or may simply be accessible to the apparatus 500 (e.g., externally located and/or situated).

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

Throughout the description and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments are associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is practicable.

As used in this disclosure a "network" is an environment in which one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is practicable.

In addition, some embodiments described in this disclosure are associated with an "indication". As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something can be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer readable memory" and/or "tangible media" specifically exclude signals, waves, and wave forms or other intangible or transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined in this disclosure and includes many exemplary protocols that are also applicable here.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described in this disclosure (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, and described methods may be depicted (e.g., in one or more flowcharts) as steps connected by directional arrows, such processes may be configured to work in different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described in this disclosure may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described in this disclosure. Further, despite any depiction of the databases as tables, other formats (including relational databases, object-based models, hierarchical electronic file structures, and/or distributed databases) could be used to store and manipulate the data types described in this disclosure. Likewise, object methods or behaviors of a database can be used to implement various processes, such as those described in this disclosure. In addition, the databases may, in a known manner, be stored locally or remotely from a device that accesses data in such a database. Furthermore, while unified databases may be contemplated, it is also possible that the databases may be distributed and/or duplicated amongst a variety of devices.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

It will be readily apparent that the various methods and algorithms described in this disclosure may be implemented by, e.g., appropriately programmed computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer readable medium and/or memory for performing the process. The apparatus that performs the process can include components and devices (e.g., a processor, input and output devices) appropriate to perform the process. A computer readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

The invention claimed is:

1. A method, comprising:
  receiving, by a computer comprising at least one processor, information defining, for at least one state machine, a plurality of states and respective transitions between the states,
    wherein the plurality of states includes a first defined state that is associated with a respective plurality of outbound transition options;
  initializing, by the computer, based on the information defining the plurality of states and respective transitions and, in accordance with an application defining a plurality of processes, a decision engine comprising the at least one state machine;
  receiving, by the computer in accordance with the application, information defining at least one set of weighted choices;
  receiving, by the computer in accordance with the application, an indication of an occurrence of an event;
  executing, by the computer in accordance with the application, the decision engine to select randomly, from a set of weighted choices, a weighted choice based on the event;
  determining, based on the randomly selected weighted choice, the information defining the plurality of states, and the respective plurality of outbound transition options associated with the first defined state, a new state of the at least one state machine;
  transmitting, from the decision engine to the application, an indication of the new state that is based on the randomly selected weighted choice; and
  executing, by the computer in accordance with the application, a process of the application based on the new state.

2. An apparatus comprising:
a processor;
a computer readable memory in communication with the processor, the computer readable memory storing instructions, for an application defining a plurality of processes, that when executed by the processor result in:
receiving information defining, for at least one state machine, a plurality of states and respective transitions between the states,
wherein the plurality of states includes a first defined state that is associated with a respective plurality of outbound transition options;
initializing, based on the information defining the plurality of states and respective transitions and, in accordance with the application defining the plurality of processes, a decision engine comprising the at least one state machine;
receiving information defining at least one set of weighted choices;
receiving an indication of an occurrence of an event;
executing the decision engine, in accordance with the application, to select randomly, from a set of weighted choices using the at least one state machine, a weighted choice based on the event;
determining, based on the randomly selected weighted choice, the information defining the plurality of states, and the respective plurality of outbound transition options associated with the first defined state, a new state of the at least one state machine;
transmitting to the application an indication of the new state that is based on the randomly selected weighted choice; and
executing a process of the application based on the new state.

3. The apparatus of claim 2, wherein executing the process of the application comprises enabling a program object associated with the new state.

4. The apparatus of claim 2, wherein the decision engine comprises embedded code of the application.

5. The apparatus of claim 2, wherein the information defining the plurality of states and the respective transitions between the states comprises a specification file in XML.

6. The apparatus of claim 5, wherein initializing the decision engine comprising the at least one state machine comprises:
parsing the specification file to generate the at least one state machine.

7. The apparatus of claim 2, wherein the decision engine comprises executable objects.

8. The apparatus of claim 7, wherein at least one executable object comprises an instance of a Java class.

9. The apparatus of claim 2, wherein the event comprises an action of a user.

10. The apparatus of claim 2, wherein the event comprises an outcome of a weighted die roll.

11. The apparatus of claim 2, wherein the event comprises an outcome of a table lookup process.

12. The apparatus of claim 2, wherein the randomly selected weighted choice comprises a selection of an insurance quote package.

13. The apparatus of claim 2, wherein the weighted choices are non-uniformly weighted.

14. The apparatus of claim 2, wherein the event is associated with a request by a user to navigate from a first webpage to a second webpage.

15. The apparatus of claim 2, wherein executing, by the computer in accordance with the application, the decision engine to select randomly, from the set of weighted choices using the at least one state machine, the weighted choice based on the event comprises:
determining a random outcome and selecting, based on the random outcome, one of the weighted choices from the set of weighted choices, wherein the selected weighted choice is mapped to the determined random outcome.

16. A web application server comprising:
a processor; and
a computer readable memory in communication with the processor, the computer readable memory storing instructions for a web application defining a plurality of processes, that when executed by the processor result in:
receiving information for a navigation framework defining, for a state machine, a plurality of states and respective transitions between the states,
wherein the plurality of states includes a first defined state that is associated with a respective plurality of outbound transition options;
initializing, based on the navigation framework defining the plurality of states and respective transitions, and in accordance with the web application defining the plurality of processes, a decision engine comprising the state machine;
receiving information defining a set of at least two weighted choices,
wherein the at least two weighted choices are non-uniformly weighted within the set;
receiving an indication of an occurrence of an event,
wherein the event is associated with a request by a user to navigate from a first webpage to a second webpage;
based on the event, executing the decision engine in accordance with the web application to choose, at random, one of the at least two non-uniformly weighted choices;
determining, based on the randomly chosen, non-uniformly weighted choice and the navigation framework defining the plurality of states and the respective plurality of outbound transition options associated with the first defined state, a new state of the state machine;
transmitting to the web application an indication of the new state of the state machine; and
executing a process of the web application based on the new state,
wherein executing the process of the web application based on the new state comprises:
determining content for the second webpage; and
transmitting the second webpage to the user.

17. The web application server of claim 16, wherein the randomly chosen, non-uniformly weighted choice comprises a selection of an insurance quote package for the user.

18. The web application server of claim 16, wherein determining the content for the second webpage is conducted without changing page markup of the second webpage.

19. The web application server of claim 16, wherein the request by the user comprises an HTTP message, and wherein the instructions when executed by the processor further result in:
translating the HTTP message into an event object.

20. The web application server of claim 16, wherein the navigation framework defining the plurality of states and respective transitions is externalized from the instructions for the web application.

21. The web application server of claim 16, wherein executing the decision engine to choose, at random, one of the at least two non-uniformly weighted choices comprises:
 determining a random outcome and selecting, based on the random outcome, one of the at least two non-uniformly weighted choices that is mapped to the determined random outcome.

* * * * *